United States Patent [19]

Furushima et al.

[11] Patent Number: 5,410,423
[45] Date of Patent: Apr. 25, 1995

[54] METHOD OF FABRICATING A LIQUID CRYSTAL PANEL USING A DUMMY SEAL WHICH IS CLOSED AFTER HARDENING

[75] Inventors: Teruhiko Furushima, Atsugi; Moriyuki Okamura, Sagamihara; Masaru Kamio, Kawasaki; Yutaka Genchi, Atsugi, all of Japan

[73] Assignee: Canon Kabushiki Kaisha, Tokyo, Japan

[21] Appl. No.: 19,568

[22] Filed: Feb. 18, 1993

[30] Foreign Application Priority Data

Feb. 21, 1992 [JP] Japan .................................. 4-070131

[51] Int. Cl.⁶ .............................................. G02F 1/13
[52] U.S. Cl. .................................... 359/80; 359/82; 359/62; 445/24
[58] Field of Search .................... 359/80, 59, 82, 62; 257/67, 347; 437/62, 90; 445/24, 25

[56] References Cited

U.S. PATENT DOCUMENTS

| | | | |
|---|---|---|---|
| 4,255,848 | 3/1981 | Frees et al. | 359/80 |
| 4,806,996 | 2/1989 | Luryi | 257/190 |
| 4,808,983 | 2/1989 | Benjamin et al. | 359/57 |
| 4,875,086 | 10/1989 | Malhi et al. | 257/351 |
| 4,910,165 | 3/1990 | Lee et al. | 257/347 |
| 4,925,805 | 5/1990 | van Ommen et al. | 247/347 |
| 5,206,749 | 4/1993 | Zavrachy et al. | 359/59 |

FOREIGN PATENT DOCUMENTS

| | | |
|---|---|---|
| 55-02282 | 1/1980 | Japan . |
| 58-121021 | 7/1983 | Japan . |
| 58-139126 | 8/1983 | Japan . |
| 298219 | 6/1988 | Japan . |
| 63-271226 | 11/1988 | Japan . |
| 03298219 | 12/1988 | Japan . |
| 4338926 | 11/1992 | Japan . |
| 2183073 | 5/1987 | United Kingdom . |

OTHER PUBLICATIONS

Patent Abstracts of Japan, vol. 6, No. 258 (Dec. 1982) P-163) (1136).
Patent Abstracts of Japan, vol. 9, No. 161 (Jul. 1984) (P370) (1884).
Patent Abstracts of Japan, vol. 13, No. 127 (Dec. 1988) (P-848).

*Primary Examiner*—William L. Sikes
*Assistant Examiner*—Kenneth Parker
*Attorney, Agent, or Firm*—Fitzpatrick, Cella, Harper & Scinto

[57] ABSTRACT

In fabricating a liquid crystal panel, preparing a substrate sized larger than the same at a finished state, following to bonding the prepared substrate, an excess peripheral portion of the substrate is cut off. A dummy seal having an opening portion at least in part thereof is formed on the excess portion of the substrate. And, the opening portion of the dummy seal is sealed off to make the dicing after bonding of upper and lower substrates and curing of the seal.

5 Claims, 2 Drawing Sheets

METHOD OF FABRICATING A LIQUID CRYSTAL PANEL USING A DUMMY SEAL WHICH IS CLOSED AFTER HARDENING

BACKGROUND OF THE INVENTION

1. Field of the Industrial Applicability

The present invention relates to a method of fabricating a liquid crystal panel, and more particularly to a method of fabricating a liquid crystal panel which is produced by using a substrate larger in size than a completed panel substrate, and cutting off excess peripheral portions by dicing, after bonding of substrates.

2. Related Background Art

Conventional liquid crystal panels of the simple matrix type have been fabricated with a slab chocolate method in which a plurality of panel patterns are formed on a large substrate, and such substrates are then bonded and scribed to divide into individual panels. When using a quartz glass or Si wafer for a TFT substrate of the liquid crystal panel, because the scribe is difficult, a dicing method is adopted in which a disk-like grinding stone is rotated for cutting.

However, the dicing method had a problem that because the liquid crystal inlets of the liquid crystal panels were not yet closed at the time of dicing, the cooling water which was necessary to be flowed therethrough in the dicing process might enter the liquid crystal panels.

Means for resolving such a problem has been disclosed in Japanese Patent Application Laid-open No. 63-298219, in which the invasion of the cooling water into the liquid crystal panels is prevented in such a way that a larger substrate than a completed panel substrate is used to form a dummy seal in the excess peripheral portion of the substrate, and the dicing is performed after curing of the seal.

However, the above-described conventional method had a problem that since in bonding two substrates, the internal air might be enclosed by the dummy seal which was formed in a thickness of two to three times a desired cell gap thickness, the air compressed to half or one-third of its volume by a bonding pressure would expand due to heating for curing the seal, thereby enlarging the cell gap, so that a desired cell gap could not be obtained.

SUMMARY OF THE INVENTION

To resolve the above-mentioned conventional problems, it is an object of the present invention to provide a method of fabricating a liquid crystal panel in which the invasion of the cooling water into the liquid crystal panel at the time of dicing is prevented, and the enlargement of the cell gap at the time of heat curing the seal is prevented.

It is another object of the present invention to provide a method of fabricating a liquid crystal panel in which a desired cell gap can be stably obtained, whereby an excellent display can be realized.

It is a further object of the present invention to provide a method of fabricating a reliable liquid crystal panel without restrictions on the temperature condition for the heat curing.

It is still another object of the present invention to provide a method of fabricating a liquid crystal panel in which a larger substrate than a finished panel substrate is cut off excess peripheral portions thereof by dicing after bonding of the substrates, characterized in that a dummy seal having an opening portion at least in part thereof is formed on the excess portion of the substrate, and the opening portion of the dummy seal is sealed off to make the dicing after bonding of upper and lower substrates and curing of the seal.

DETAILED DESCRIPTION OF THE PREFERRED EMBODIMENTS

The preferred embodiments of the present invention are as follows. That is, a method of fabricating a liquid crystal panel according to the present invention in which a larger substrate than a completed panel substrate is used to cut off excess peripheral portions by dicing after bonding of substrates, is characterized in that a dummy seal having an opening portion at least in part thereof is formed on the excess portion of the substrate, and the opening portion of the dummy seal is sealed off to make the dicing after bonding of upper and lower substrates and curing of the seal.

Since the dummy seal is provided with an opening portion in this invention, a desired cell gap can be obtained without enclosing the air between substrates, whereby a liquid crystal panel which can make excellent display can be fabricated. Further, the variation in the cell gap owing to expansion of the air on heat curing of the sealing material can be prevented. Accordingly, it is possible to fabricate a reliable liquid crystal panel without restrictions on the temperature condition of the heat curing. And since the opening portion of the dummy seal is sealed off before dicing, the invasion of the cooling water into the liquid crystal panel can be prevented.

In the present invention, the material for the dummy seal may be a thermosetting epoxy resin or ultraviolet setting epoxy resin, for example. Specific examples of the thermosetting epoxy resin include XN-21 (trade name) and XN-5A (trade name) made by Mitsui Toatsu Chemical. The thickness of dummy seal is typically in a range from 4 $\mu$m to 20 $\mu$m, and preferably in a range from 4 $\mu$m to 7 $\mu$m to be equivalent to a gap thickness of liquid crystal layer. The width of dummy seal is typically in a range from 0.1 mm to 1.5 mm, and preferably in a range from 0.1 mm to 0.5 mm. The dummy seal is formed as in the following way, for example. That is, a seal is printed in a thickness (e.g., about 10 $\mu$m to 30 $\mu$m) of approximately two to three times the thickness of final seal, and in a print width of about 0.1 mm to 1.5 mm, by seal printing, and then is pressurized and treated with the heat curing to form a dummy seal. In the present invention, the opening portion of the dummy seal is sealed off by an adhesive or epoxy resin.

The present invention will be described below with reference to the drawings.

Embodiment 1

Figure 1:
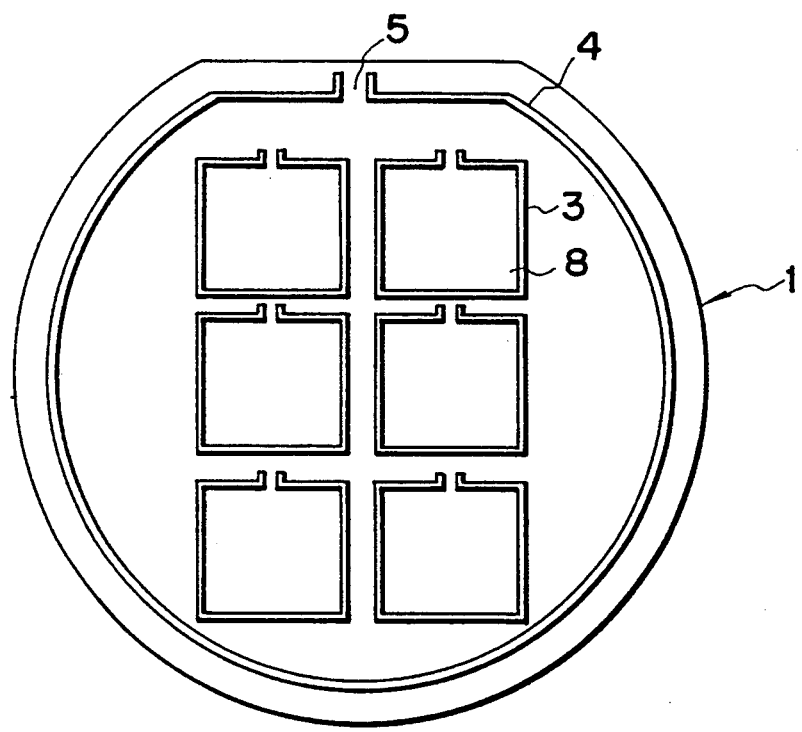
FIG. 1 is a schematic view showing the state of a substrate before bonding of substrates in the present invention.
Figure 2:
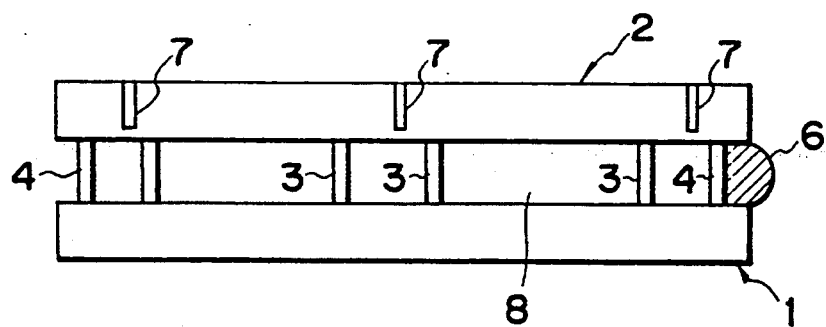
FIG. 2 is a schematic view showing one example of a liquid crystal panel after dicing.

FIG. 1 is an upper view showing a state before bonding of substrates in this embodiment, and FIG. 2 is a cross-sectional view of a liquid crystal panel after bicing.

A TFT substrate 1 composed of Si wafer on which the electrodes for driving the liquid crystal are formed and the thin film transistors are fabricated and an opposite substrate 2 composed of a low alkali glass of low thermal expansion (AL made by Asahi Glass) were treated for orientation. On one substrate, seals 3 constituting liquid crystal panels 8 and a dummy seal 4 on peripheral excess portion of the substrate, as shown in FIG. 1, were formed using a sealing material having a spacer mixed for forming a cell gap at good precision.

Two substrates were bonded in a predetermined alignment, pressurized, and heated to cure the seals 3 and the dummy seal 4. Since an opening portion 5 for the outlet of the air was provided on the dummy seal 4, it was possible to prevent the variation in the gap width due to thermal expansion of the air on the heat curing.

Then, the opening portion 5 of outer peripheral seal was sealed off by instantaneous adhesive 6, and diced (half-cut 7) in which the substrate was not completely cut. The provision of the dummy seal 4 can prevent the invasion of the cooling water into the liquid crystal panels 8 at the time of dicing.

After the dicing, the substrate was dried in a drying process to remove water contents therefrom, and divided into individual panels by applying a shearing force. After dividing, liquid crystal was poured into respective panels, and the inlet of the liquid crystal was sealed by sealant. The processes involving this liquid crystal relied on any of the well-known fabrication techniques for liquid crystal display.

The surface opposite to that as formed with TFT of Si substrate is covered with hydrofluoric acid resistant rubber except for immediately below the liquid crystal pixel portion, and Si wafer was partially removed down to insulation layer, using a mixture solution of hydrofluoric acid, acetic acid and nitric acid, whereby light transmission-type liquid crystal image displays could be completed.

Note that Si wafer for use with the TFT substrate 1 was fabricated by the following method.

Anodization was conducted on a P-type (100) monocrystalline Si substrate having a thickness of 300 microns in an HF solution to form a porous Si substrate.

Anodization was performed under the following conditions:

Applied voltage: 2.6 (V)
Current density: 30 (mA·cm$^{-2}$)
Anodizing solution: $HF:H_2O:C_2H_5OH=1:1:1$
Time: 2.4 (hours)
Thickness of porous Si: 300 ($\mu$m)
Porosity: 56 (%)

An Si epitaxial layer with a thickness of 1.0 $\mu$m was grown on the P-type (100) porous Si substrate by low-pressure CVD. Deposition was conducted under the following conditions.

Source gas: $SiH_4$
Carrier gas: $H_2$
Temperature: 850° C.
Pressure: $1 \times 10^{-2}$ Torr
Growth rate: 3.3 nm/sec Then, a 1,000 Å oxide layer was formed on the surface of this epitaxial layer, and on this oxide surface, another Si substrate having formed a 5,000 Å oxide layer, a 1,000 Å oxide layer and a 1,000 Å nitride layer on its surface was superposed. The whole structure was heated at 800° C. in a nitrogen atmosphere for 0.5 hour to firmly join the two substrates to each other.

Thereafter, selective etching was conducted on the bonded substrates in a mixed solution of 49% hydrofluoric acid, alcohol and 30% hydrogen peroxide solution (10:6:50) without stirring. In sixty five minutes, the porous Si substrate was completely removed by selective etching with the monocrystalline Si layer acting as an etch stopper, only the non-porous Si layer being left behind without etching. The etching rate of the non-porous monocrystalline Si in such etching solution was so low that the etching layer reached only a maximum of 50 Å in sixty five minutes, with the selection ratio of the etching rate of the non-porous monocrystalline Si to that of the porous layer being 1:10$^5$ or more, so that the amount of non-porous layer which was etched (several tens angstroms) could be ignored in the practical operation. Thus, the 200-micron thick porous Si substrate was removed, with a result that the 1.0 $\mu$m thick monocrystalline Si layer was formed on $SiO_2$. When $SiH_2Cl_2$ was used as the source gas, the growth temperature had to be higher by several tens of degrees. However, high-speed etching characteristic to the porous substrate was maintained.

A field effect transistor was fabricated on the above-mentioned monocrystalline Si thin film and connected to creat complementary elements and its integrated circuit, thereby forming pixel switching elements and a drive circuit necessary for the liquid crystal image display. Note that the method of fabricating each transistor relied on one of the well-known MOS integrated circuit fabrication techniques.

Also, the opposite substrate 2 was fabricated in the following way.

A chromium dioxide film was formed as the black matrix on a low alkali glass substrate of low thermal expansion by sputtering, and shaped into a predetermined pattern by photo-etching. Then, each filter of red, blue and green was formed by pigment dispersing, a top coat layer was provided thereon, and further an ITO layer was formed by sputtering.

Embodiment 2

Figure 3:
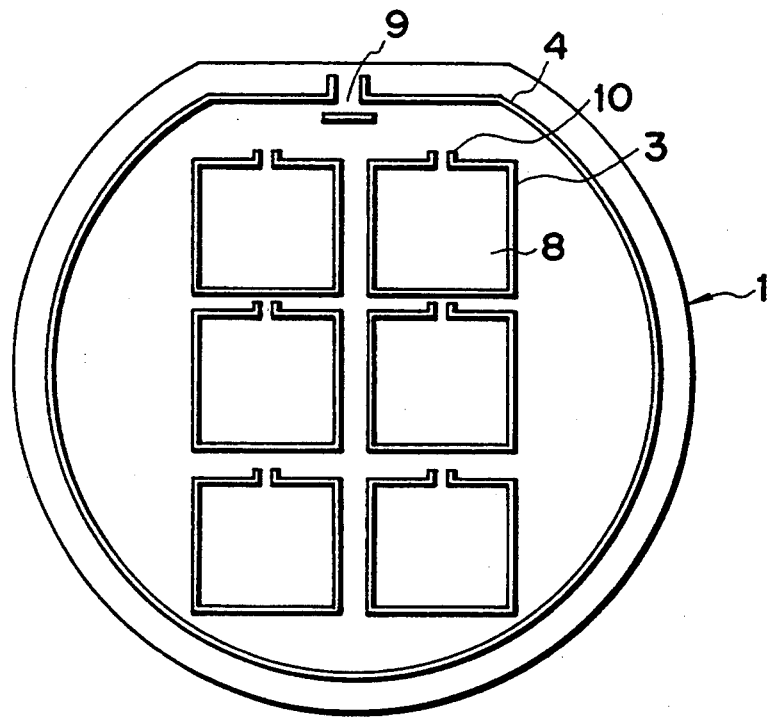
FIG. 3 is a schematic view of a substrate before bonding of substrates in the present invention.

A liquid crystal panel was fabricated in the same way as in the embodiment 1, except that a bank 9 was provided on the opening portion 5 of the dummy seal 4 as shown in FIG. 3.

Because a sealant for the opening portion 5, even though being low viscous, can be dammed by the bank 9, according to this embodiment, the sealant can be prevented from flowing within the dummy seal 4 owing to surface tension to seal off liquid crystal inlets 10 of individual panels 3. Accordingly, using a dummy seal 4 of this shape, the usable range of viscosity of sealant for the dummy seal 4 can be extended.

Note that the shape of bank is not limited to that as shown in FIG. 3, but a variety of shapes such as "]" may be used.

Embodiment 3

A polycrystalline silicone was formed on a quartz glass as the TFT substrate, and a field effect transistor was created on the polycrystalline silicone thin film, and connected to creat complementary elements and its integrated circuit, thereby forming pixel switching elements and a drive circuit necessary for the liquid crystal image display.

Figure 4:
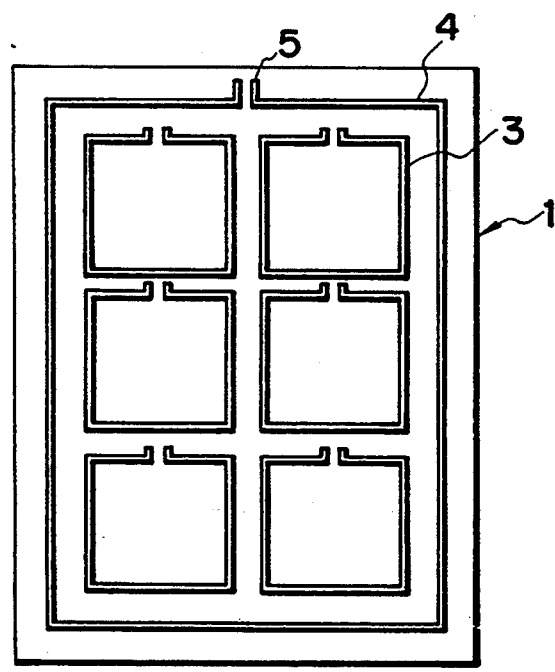
FIG. 4 is a schematic view showing the state of a substrate before bonding of substrates in the present invention.

A chromium dioxide film was first formed as the black matrix on a quartz glass substrate as the opposite substrate by sputtering, and shaped into a predetermined pattern by photo-etching. Then, each filter of red, blue and green was formed by a dyeing method, a top coat layer was provided thereon, and further an ITO layer was formed by sputtering. FIG. 4 shows schematically a shape of the dummy seal in this embodiment.

While the quartz glass was of a square shape in this embodiment, it may be formed in the same shape as the wafer.

As above described, since the dummy seal is provided with an opening portion according to the present invention, a desired cell gap can be obtained without enclosing the air between substrates, whereby a liquid crystal panel which can make excellent display can be fabricated. Further, the variation in the cell gap due to expansion of the air on heat curing of the sealant can be prevented. Accordingly, a reliable liquid crystal panel can be fabricated without restrictions on the temperature condition for the heat curing. And since the opening portion of dummy seal is sealed off before dicing, the invasion of the cooling water into the liquid crystal panel can be prevented.

What is claimed is:

1. A method of fabricating a liquid crystal panel by bonding TFT substrate, on which plural TFTs are formed with an opposing substrate, and then dividing the substrates into each of display panels, comprising steps of:

forming a dummy seal having an opening at least in part thereof, said dummy seal being located at a peripheral area around at least 2 liquid crystal panels and not being located at the display panel area on at least one of said TFT substrate and the opposing substrate;

bonding said TFT substrate with said opposing substrate;

hardening said dummy seal;

sealing the opening of said hardened dummy seal; and dividing said substrates into display panels.

2. The method of fabricating the liquid crystal panel according to claim 1, wherein one of the substrates comprises an Si wafer.

3. The method of fabricating the liquid crystal panel according to claim 2, further comprising the step of producing said Si wafer by making porous a monocrystalline Si substrate and thereafter forming an epitaxial layer on said porous substrate layer.

4. The method of fabricating the liquid crystal panel according to claim 1, further comprising the step of selecting an adhesive as a sealant for sealing said opening.

5. The method of fabricating a liquid crystal panel according to any of claims 1–4, wherein said dummy seal is a thermally hardening resin.

* * * * *

UNITED STATES PATENT AND TRADEMARK OFFICE
CERTIFICATE OF CORRECTION

PATENT NO. : 5,410,423
DATED : April 25, 1995
INVENTOR(S) : TERUHIKO FURUSHIMA, ET AL It is certified that error appears in the above-indentified patent and that said Letters Patent is hereby corrected as shown below:

<u>ON TITLE PAGE</u>

In [56] References Cited, under U.S. PATENT DOCUMENTS:
"4,255,848  3/1981  Frees et al." should read
--4,255,848  3/1981  Freer et al.--;
"5,206,749  4/1993  Zavrachy et al." should read
--5,206,749  4/1993  Zavracky et al.--.

In [56] References Cited, under FOREIGN PATENT DOCUMENTS:
"298219  6/1988  Japan" should be deleted;
"03298219  12/1988  Japan" should read
--63-298219  12/1988  Japan--; and
"4338926  11/1992  Japan" should read
--4-338926  11/1992  Japan.--.

Signed and Sealed this

Eighth Day of August, 1995

Attest:

BRUCE LEHMAN

*Attesting Officer*     *Commissioner of Patents and Trademarks*